(12) United States Patent
Humphrey et al.

(10) Patent No.: US 9,738,202 B2
(45) Date of Patent: Aug. 22, 2017

(54) REGULATING DUMP RATE OF TRUCKS

(71) Applicant: Caterpillar Inc., Peoria, IL (US)

(72) Inventors: James D. Humphrey, Decatur, IL (US); Mark H. Banham, Victoria Point (AU)

(73) Assignee: Caterpillar Inc., Peoria, IL (US)

( * ) Notice: Subject to any disclaimer, the term of this patent is extended or adjusted under 35 U.S.C. 154(b) by 63 days.

(21) Appl. No.: 14/849,905

(22) Filed: Sep. 10, 2015

(65) Prior Publication Data

US 2017/0072826 A1   Mar. 16, 2017

(51) Int. Cl.
   *B60P 1/28*   (2006.01)

(52) U.S. Cl.
   CPC .................................. *B60P 1/283* (2013.01)

(58) Field of Classification Search
   None
   See application file for complete search history.

(56) References Cited

U.S. PATENT DOCUMENTS

| | | | |
|---|---|---|---|
| 3,030,034 A | | 4/1962 | Becker |
| 4,909,449 A | * | 3/1990 | Etheridge ............... B02C 25/00 241/34 |
| 5,074,435 A | | 12/1991 | Suverkrop et al. |
| 5,228,750 A | * | 7/1993 | Hagenbuch ............... B60P 1/16 105/423 |
| 5,236,261 A | * | 8/1993 | Hagenbuch ............. B65D 88/30 222/503 |
| 5,893,399 A | * | 4/1999 | Kearney ............... B65G 69/187 141/192 |
| 6,581,778 B1 | * | 6/2003 | Kato .................... B65G 69/186 209/21 |
| 7,765,039 B1 | * | 7/2010 | Hagenbuch ............ G07C 5/008 340/436 |
| 8,567,135 B2 | * | 10/2013 | Babcock ................... E04H 7/30 141/286 |
| 8,770,501 B2 | * | 7/2014 | Laukka ................... B02C 21/00 241/152.2 |
| 8,948,974 B2 | | 2/2015 | Montocchio |
| 9,242,792 B2 | * | 1/2016 | Babcock ................ B65D 88/32 |
| 9,481,964 B1 | * | 11/2016 | Marsolek ................. G08G 1/20 |
| 2006/0232121 A1 | * | 10/2006 | Morley ..................... B60P 1/26 298/23 S |

(Continued)

FOREIGN PATENT DOCUMENTS

| | | |
|---|---|---|
| JP | H01168363 | 7/1989 |
| JP | 2005305277 | 11/2005 |

*Primary Examiner* — Truc M Do

(57) ABSTRACT

A system for regulating a dump rate of a truck is disclosed. The truck is configured to carry material and dump the material in a container. The system includes a first detection module and a controller in communication with the first detection module. The first detection module generates a signal indicative of a draw down rate of the container. The draw down rate corresponds to a rate at which the material is discharged from the container. The controller determines the draw down rate of the contained based on the signal received from the first detection module. The controller further determines a level of the material within the container based on the draw down rate. The controller then regulates the dump rate of the truck based on a relationship between the level of the material within the container and a threshold level.

18 Claims, 4 Drawing Sheets

(56) References Cited

U.S. PATENT DOCUMENTS

| | | | |
|---|---|---|---|
| 2008/0201994 A1* | 8/2008 | Crago | E01H 5/06 37/197 |
| 2010/0084908 A1* | 4/2010 | Montocchio | B60P 1/283 298/22 C |
| 2010/0332051 A1* | 12/2010 | Kormann | A01F 12/46 701/2 |
| 2013/0080000 A1* | 3/2013 | Von der Lippe | E01C 23/088 701/50 |

* cited by examiner

REGULATING DUMP RATE OF TRUCKS

TECHNICAL FIELD

The present disclosure relates to a system and a method for regulating a dump rate of a truck.

BACKGROUND

For construction of large structures, material, such as sand, gravel, and dirt, are transported to a construction site using trucks. The trucks carry the material to the construction site and then dump the material into various machines, such as crushers, hoppers, and mixers. Usually, such trucks dump the material into hoppers and the hoppers then feed the material to the various machines. The hopper can have a predefined capacity for retaining a specified amount of material at one time. The trucks should dump the material into the hopper so that the hopper is not overloaded or under-loaded, ensuring an effective and productive feeding of the material to the machines.

Conventionally, a light indicator system is used for controlling the amount of material fed into the hopper. The light indicator system flashes a red light when the remaining capacity in the hopper is less than the full amount of the truck load, thereby preventing the truck from starting to dump its material. The red light may also indicate that the truck must stop dumping the material because the hopper is overloaded. Similarly, the light indicator system may flash a green light when the capacity in the hopper is below a full truck load. The green light indicates that the truck can dump or resume dumping material in the hopper because the hopper is under-loaded.

However, such conventional systems do not take into account the material that is simultaneously being released from the hopper for processing. Therefore, at one end, the hopper is receiving the material from the truck, and at the other end, the hopper is discharging the material for further processing. Neglecting the amount of material being discharged from the hopper may lead to errors resulting in overloading and under-loading of the hopper. This may also result in a delay in dumping the material into the hopper. Specifically, by the time the green light flashes and the truck is ready to dump the material into the hopper, the amount of material in the hopper may further decrease. As a result, the time required for filling the hopper with the material from the truck may also increase. Therefore, accuracy and effectiveness of the dumping of the material into the hopper are compromised. If enough delay is introduced, the discharge from the hopper to the machines can be compromised.

U.S. Pat. No. 4,909,449 discloses a control system for a primary rock crushing stage of a rock crushing plant. A first stage of the rock crushing plant is controlled by controlling a feed rate supplied to a primary rock crusher. Further, the first stage is controlled by indicating to haul vehicles that are transporting rock to the plant from a quarry about the time when the load being hauled can be dumped in to a hopper supplying the feeder for the primary rock crusher. Non-material contacting level sensors, such as ultrasonic transducers are used to sense the level of rock within the hopper and within the cavity of the rock crusher. Further, the load of the motor driving the primary rock crusher and the motor driving an output conveyor that receives the discharged rock from the primary rock crusher is monitored. The output signals from the level and load sensors are compared with preset values to adjust the feed rate of rock being delivered to the primary crusher in order to optimize the throughput of rock in the first crushing stage of the plant. However, the control system is limited to a rock crushing plant. Further, the control system is complicated and expensive.

SUMMARY OF THE DISCLOSURE

In one aspect of the present disclosure, a system for regulating a dump rate of a truck is provided. The truck is configured to carry material and dump the material in a container. The system includes a first detection module configured to generate a signal indicative of a draw down rate of the container. The system further includes a controller in communication with the first detection module. The controller is configured to determine the draw down rate of the container based on the signal received from the first detection module. The controller also determines a level of the material within the container based on the draw down rate. Further, the controller regulates the dump rate of the truck based on a relationship between the level of the material within the container and a threshold level.

In another aspect of the present disclosure, a method of regulating a dump rate of a truck is provided. The truck is configured to carry a material and dump the material in a container. The method includes determining a draw down rate of the container via a first detection module. The method further includes determining a level of the material within the container based on the draw down rate. Further, the method includes regulating the dump rate of the truck based on a relationship between the level of the material within the container and a threshold level.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
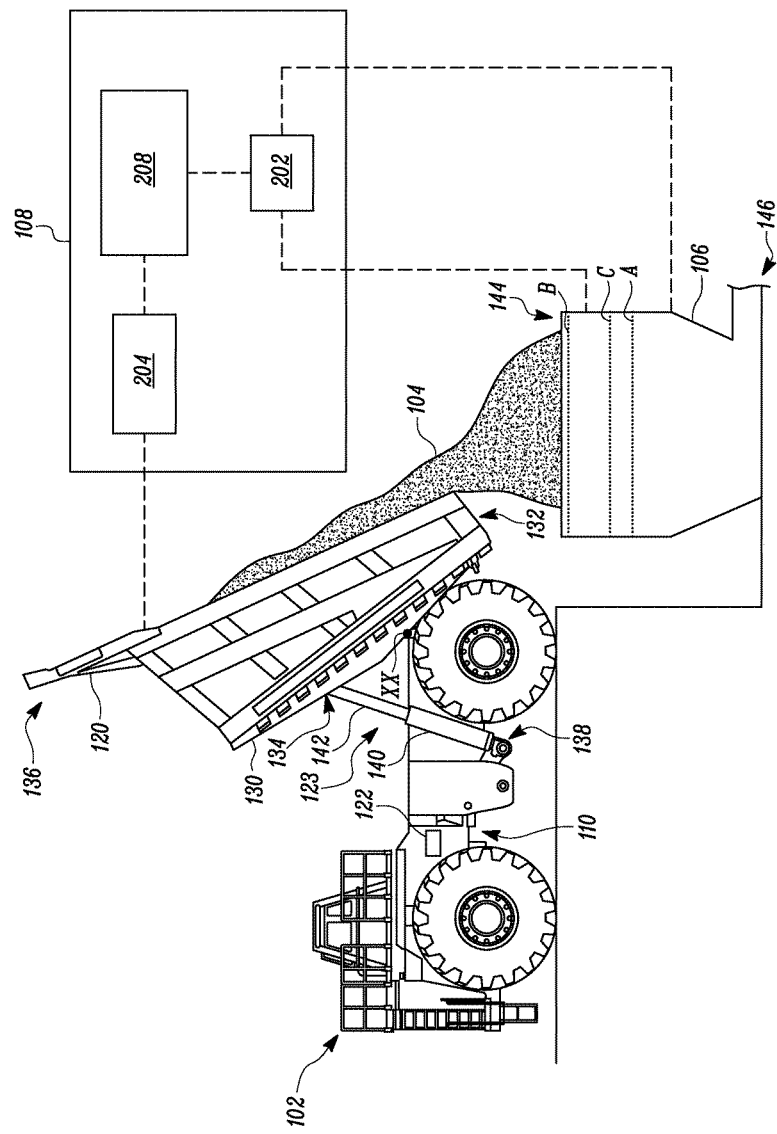
FIG. 1 is a schematic side view of an exemplary truck dumping a material into a container, according to an embodiment of the present disclosure.

FIG. 1 illustrates a schematic side view of an exemplary worksite and a truck 102 operating at the worksite. The truck 102 is configured to dump material 104 into a container 106 located at the worksite, according to an embodiment of the present disclosure. The worksite may be any location, where the material 104 is dumped for further processing, for example, for mining or construction purposes. In one example, the worksite may include, but is not limited to, a mine, a construction site of residential buildings, or a construction site of commercial buildings. In case of the construction site, the material 104 may include, but is not limited to, sand, gravel, and concrete. The material 104 may vary based on the worksite and usage. Further, a system 108 is provided in communication with the truck 102 and the container 106 for regulating a dump rate of the truck 102. The dump rate of the truck 102 is a rate at which the material 104 is being dumped from the truck 102 into the container 106.

In one example, the truck 102 may be a self-propelled vehicle being used for transporting the material 104 from a source location of the material 104 to the worksite where the material 104 is unloaded. At the worksite, the truck 102 may dump the material 104 into the container 106. The truck 102 may be an on-road truck or an off-road truck. Off-road trucks may be used at large-scale construction worksites, such as a mine site. Even though the truck 102 in the present embodiment is a truck, other type of vehicles that have the functionality of dumping the material 104 can be used, without departing from the scope of the present disclosure.

The truck 102 includes a payload carrier 120 supported on a chassis 110. The truck 102 further includes a hydraulic system 122 in communication with the payload carrier 120 for raising or lowering the payload carrier 120 relative to the chassis 110. The payload carrier 120 is configured to contain the material 104 that is unloaded into the container 106 at the worksite. The payload carrier 120 is pivotally coupled to the chassis 110 to move about a pivotal axis XX. The chassis 110 is connected to a bottom surface 130 of the payload carrier 120 adjacent to a rear end 132 thereof. In an original position, the payload carrier 120 is supported on the chassis 110. For dumping the material 104 off the truck 102, the payload carrier 120 is raised from the original position thereof to an elevated position. In the elevated position, the material 104 flows by gravity in a rearward direction off the payload carrier 120. The payload carrier 120 may include a rear gate (not shown) that may open for discharging the material 104 off the payload carrier 120. For loading the material 104 into the truck 102, the payload carrier 120 is lowered down to the original position thereof. Thus the payload carrier 120 is moved between the original position and the elevated position thereof about the pivotal axis XX.

In the present embodiment, pivotal movement of the payload carrier 120 is actuated by the hydraulic system 122. The hydraulic system 122 may be disposed at any location in the chassis 110. The hydraulic system 122 may be used for actuating various other systems of the truck 102, such as a steering system (not shown). The truck 102 includes a hydraulic actuator 123 in fluid communication with the hydraulic system 122. The hydraulic actuator 123, on a first end 134, is connected to the bottom surface 130 of the payload carrier 120 adjacent to a front end 136 of the payload carrier 120. On a second end 138, the hydraulic actuator 123 is connected to the chassis 110. In the present embodiment, the hydraulic actuator 123 includes a cylinder 140 and a piston 142 slidably disposed within the cylinder 140. The piston 142 moves between an extended position and a retracted position upon actuation of the hydraulic system 122 to move the payload carrier 120. When the hydraulic actuator 123 is activated to raise the payload carrier 120 from the original position to the elevated position, the piston 142 moves to the extended position thereof and pivots the payload carrier 120 about the pivotal axis XX. Thus, the material 104 is dumped into the container 106 by gravity from the payload carrier 120.

The container 106 is configured to feed the material 104 to another machine, such as a mixer and/or a crusher. Therefore, at a first end 144, the container 106 is receiving the material 104 from the truck 102. At a second end 146, the material 104 is exiting the container 106 for being fed to other machines. A shape and a size of the container 106 may vary based on various parameters including, but not limited to, application of the container 106 and the operations performed.

The system 108 is provided in communication with the truck 102 and the container 106 for regulating the dump rate of the truck 102. The system 108 is further configured to determine a draw down rate of the container 106. The draw down rate of the container 106 is a rate at which the material 104 is discharged from the container 106. The draw down rate of the container 106 is determined based on various input parameters. The input parameters may include, but are not limited to, a volume of the material 104 available in the container 106 at different times and an amount of the material 104 available in the container 106 at different times. The system 108 includes a first detection module 202 and a controller 208 in communication with the first detection module 202. The first detection module 202 is configured to generate a signal indicative of the draw down rate of the container 106. The system 108 further includes a second detection module 204 configured to communicate with the controller 208 to determine an angular position of the payload carrier 120. The system 108 further includes a regulating module 206 in communication with the controller 208. The regulating module 206 is further configured to be in communication with the hydraulic system 122 of the truck 102 to actuate pivotal movement of the payload carrier 120 about the pivotal axis XX. Based on the signal, the system 108 determines the draw down rate of the container 106. Further, the system 108 determines a level A of the material 104 within the container 106 based on the draw down rate.

The system 108 may then regulate the dump rate of the truck 102 based on a relationship between the level A of the material 104 within the container 106 and a threshold level 'B'. The threshold level 'B' is indicative of a maximum level within the container 106 to accommodate the material 104, beyond which the material 104 may over flow.

Figure 2:
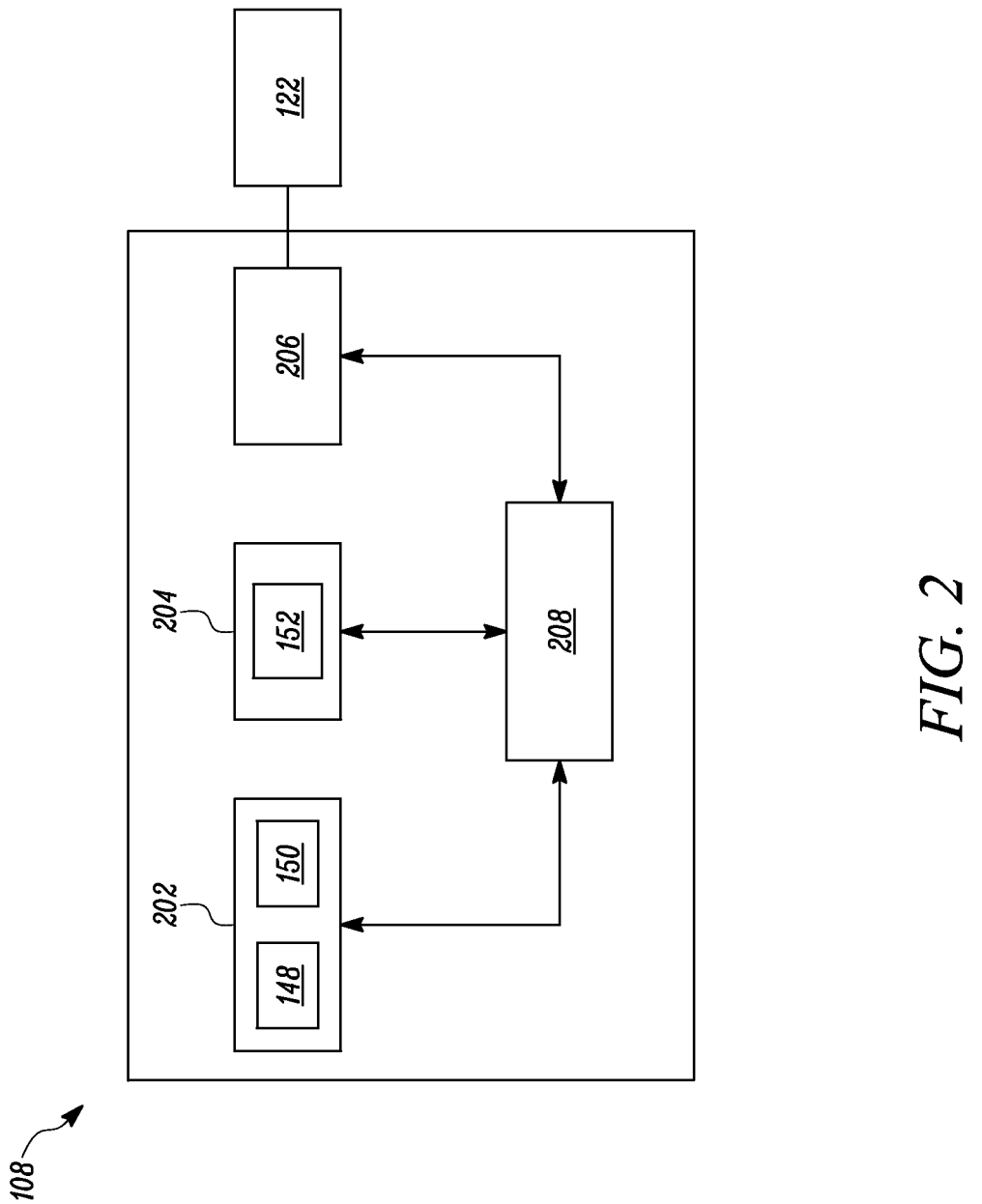
FIG. 2 is a block diagram of a system used for regulating a dump rate of the truck, according to an embodiment of the present disclosure.

FIG. 2 illustrates a block diagram of the system 108 for regulating the dump rate of the truck 102, according to an embodiment of the present disclosure. The first detection module 202 includes a scanning device 148 for dynamically detecting a volume of the material 104 in the container 106. In one example, the scanning device 148 may be disposed in the container 106. For example, the scanning device 148 may be disposed on an inner surface (not shown) of the container 106. In another example, the scanning device 148 may be disposed outside the container 106. The first detection module 202 further includes a weighing unit 150 configured to detect an amount of the material 104 discharged from the container 106. In one example, the weighing unit 150 may be disposed inside the container 106. The weighing unit 150 may determine the weight of the material 104 in the container 106 at different times. The difference in the weight of the material 104 at the different times may be used to determine the weight of the material 104 discharged from the container 106. In another example, the weighing unit 150 may be disposed outside the container 106. In such an example, the weighing unit 150 may directly determine the weight of the material 104 discharged from the container 106 by weighing the material 104 exiting the container 106.

The scanning device 148 and the weighing unit 150 are configured to detect the various input parameters. The first detection module 202 may generate a signal indicative of the parameters, such as the volume of the material 104 in the container 106 at different times, the amount of the material 104 in the container 106 at different times, and a level 'A' of the material 104 in the container 106 at different times. For example, the scanning device 148 may detect the volume of the material 104 in the container 106 at a first time T1 and a second time T2. Similarly, the weighing unit 150 may detect an amount of the material 104 discharged from the container 106 at the first time T1 and the second time T2. In another embodiment, the first detection module 202 may detect the level 'A' of the material 104 in the container 106 at the first time T1 and the second time T2.

The second detection module 204 includes a sensing unit 152 that may be configured to generate a signal indicative of a volume of the material 104 contained in the payload carrier 120 of the truck 102. The sensing unit 152 may also be configured to generate a signal indicative of the angular position of the payload carrier 120 relative to the chassis 110. The parameters, such as the volume of the material 104 contained in the payload carrier 120 and the angular position of the payload carrier 120 detected by the sensing unit 152 may be used to determine the dump rate of the truck 102 based on the draw down rate of the container 106. The sensing unit 152 may be used for dynamically detecting the volume of the material 104 contained in the payload carrier 120 of the truck 102. For example, the sensing unit 152 may detect a volume of the material 104 in the payload carrier 120 at the first time T1 and the second time T2. In one example, the sensing unit 152 may be disposed inside the payload carrier 120. The sensing unit 152 may be disposed on an inner surface (now shown) of the payload carrier 120. In another example, the sensing unit 152 may be disposed outside the payload carrier 120.

Further, the controller 208 may determine the draw down rate of the container 106, based on the input parameters indicated by the signal generated by the first detection module 202. In continuation with the previous example, based on the difference in the volume of the material 104 at the first time T1 and the second time T2, and time duration between the first time T1 and the second time T2, i.e., T2-T1, the controller 208 may determine the draw down rate. Similarly, based on the difference in the amount of material 104 discharged from the container 106 at the first time T1 and the second time T2, and the time duration between the first time T1 and the second time T2, i.e., T2-T1, the controller 208 may determine the draw down rate.

Furthermore, the controller 208 may determine the dump rate of the truck 102 based on the signal generated by the second detection module 204. For example, the controller 208 may determine the dump rate of the truck 102 based on the difference between the volume of the material 104 in the payload carrier 120 of the truck 102 at the first time T1 and the second time T2, and the time duration between the first time T1 and the second time T2, i.e., T2-T1.

Following the determination of the draw down rate, the controller 208 may determine the level 'A' of the material 104 within the container 106 based on the draw down rate. The controller 208 may then regulate the dump rate of the truck 102 based on the relationship between the level 'A' of the material 104 within the container 106 and the threshold level B. In one example, the relationship is a comparative analysis of the level 'A' of the material 104 and the threshold level B. For example, the difference between the level 'A' of the material 104 and the threshold level 'B' may be used to regulate the dump rate. In another example, the level 'A' of the material 104 may be determined in terms of percentage of the threshold level B. In yet another example, the ratio of the level 'A' of the material 104 to the threshold level 'B' may be used to regulate the dump rate of the truck 102.

In an alternative embodiment, the controller 208 may determine a rate of change of the level 'A' of the material 104 within the container 106 based on the signal received from the first detection module 202. The controller 208 may then regulate the dump rate of the truck 102 based on the rate of change of the level 'A' of the material 104. The rate of change of the level 'A' of the material 104 within the container 106 may be determined based on the signal generated by the scanning device 148 and/or the weighing unit 150. Alternately, additional level sensors (not shown) may be disposed in the container 106 to detect the level 'A' of the material 104 at a first time T1 and a second time T2. The additional sensors may be configured to generate a signal indicative of the level 'A' of the material 104 within the container 106 and communicate with the controller 208. The controller 208 may determine the draw down rate of the container 106 based on a difference between the level 'A' of the material 104 contained in the container 106 at the first time T1 and the second time T2, and the time duration between the first time T1 and the second time T2, i.e., T2-T1.

In order to regulate the dump rate of the truck 102, a predefined level 'C' is set in the container 106. The predefined level 'C' may be set by an operator before start of the dumping operation. The predefined level 'C' is below the threshold level B. When the level 'A' of the material 104 within the container 106, as determined by the controller 208, is below the predefined level C, the controller 208 is configured to generate a first warning for the operator. The first warning is an indication to the operator that the container 106 is under-loaded and more material 104 may be dumped into the container 106. In an example, the threshold level 'B' of the container 106 and the predefined level 'C' may be set as a capacity of the container 106 to receive 4 ton loads and 3 ton loads, respectively. The truck 102 may have a capacity to receive one ton load. In the present example, if the detected level 'A' of the material 104 is 2 ton loads, the controller 208 generates the first warning for the operator to control the dump rate of the truck 102 based on the level 'A' of the material 104 in the container 106 determined based on the draw down rate.

When the level 'A' of the material 104 within the container 106, as determined by the controller 208, is between the predefined level 'C' and the threshold level B, the controller 208 generates a second warning for the operator. The second warning is an indication to the operator that the container 106 is about to be overloaded and the dump rate of the truck 102 has to be reduced to avoid over-loading of the container 106. Continuing with the previous example, if the detected level of the material 104 is 3.5 tons load, the controller 208 generates the second warning for the operator.

In both the abovementioned situations, the controller 208 may regulate the dump rate of the truck 102 to avoid the under-loading and overloading of the container 106. For regulating the dump rate, the movement of the payload carrier 120 of the truck 102 is controlled. The regulating module 206 of the system 108, disposed in the truck 102, is configured to communicate with the hydraulic system 122 to move the payload carrier 120 about the pivotal axis XX. The controller 208 is configured to communicate with the regulating module 206 by sending an instruction to move the payload carrier 120 based on the relationship between the level 'A' of the material 104 within the container 106 and the threshold level B. The regulating module 206 communicates with the hydraulic system 122 for changing the angular position of the payload carrier 120. Therefore, the angular position of the payload carrier 120 controls the dumping of the material 104 into the container 106.

Figure 3:
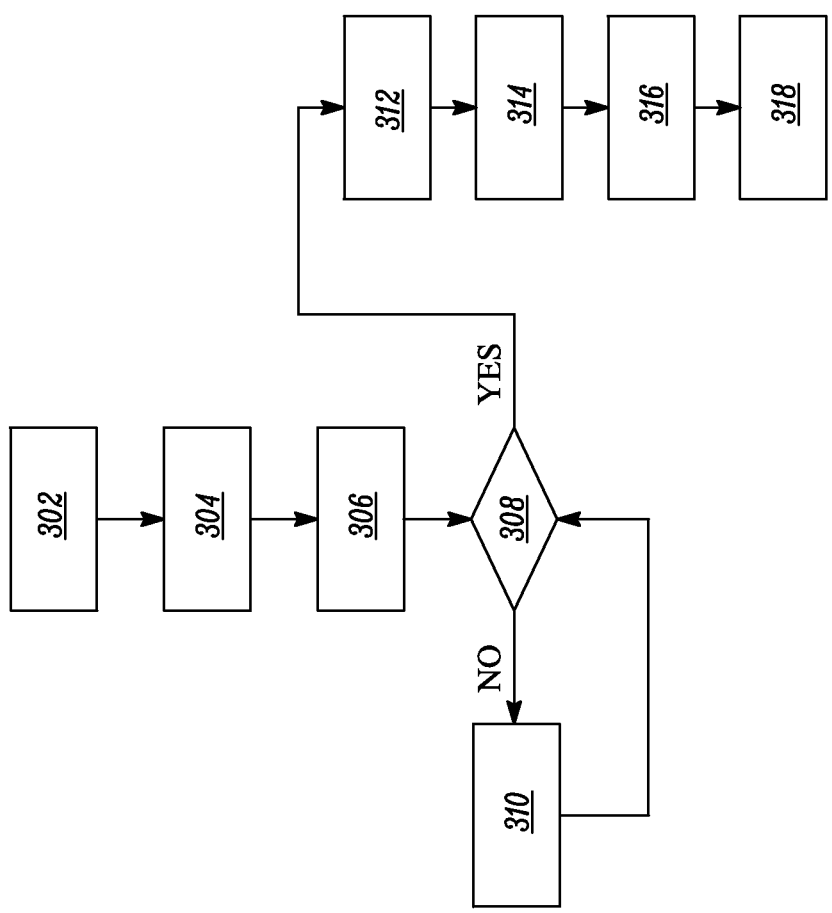
FIG. 3 is a schematic block diagram explaining dumping of the material into the container by the truck, according to an embodiment of the present disclosure.

FIG. 3 illustrates a schematic block diagram explaining dumping of the material 104 into the container 106 by the truck 102, according to an embodiment of the present disclosure. At step 302, the truck 102 carrying the material 104 arrives at the worksite. At step 304, the first detection module 202 may detect the level 'A' of the material 104 in the container 106. The level 'A' of the material 104 is detected based on at least one of the amount of the material 104 discharged from the container 106 and the volume of the material 104 contained in the container 106. The weighing unit 150 and the scanning device 148 of the first detection module 202 may be configured to detect the amount and the volume of the material 104, respectively.

At step 306, the controller 208 may determine the draw down rate of the container 106. The draw down rate of the container 106 is determined based on the input parameters related to the draw down rate detected by the first detection module 202. At step 308, the controller 208 determines whether the level 'A' of the material 104 in the container 106 is less than the threshold level B.

If the level 'A' of the material 104 is not less than the threshold level B, then, at step 310, the truck 102 waits till the level 'A' of the material 104 in the container 106 drops below the threshold level B. In case the level 'A' of the material 104 is less than the threshold level B, at step 312, the controller 208 determines the dump rate of the truck 102 based on parameters related to the truck 102.

At step 314, the controller 208 regulates the dump rate of the truck 102 based on the draw down rate of the container 106 in order to ensure that the container 106 is appropriately loaded with the material 104. For regulating the dump rate, the controller 208 instructs the regulating module 206 to control the hydraulic system 122 for moving the payload carrier 120 about the pivotal axis XX. The hydraulic system 122 controls the movement of the payload carrier 120 between the original position and the elevated position through the hydraulic actuators 123. At step 316, the truck 102 finishes dumping the material 104 into the container 106. At step 318, the truck 102 leaves the worksite and is replaced with another truck for dumping the material 104. It may also be contemplated that a second truck may be positioned adjacent to the container 106 for loading the container 106 after a first truck finished dumping the material 104 into the container 106.

INDUSTRIAL APPLICABILITY

The present disclosure relates to the system 108 for regulating the dump rate of the truck 102 during dumping of the material 104 into the container 106. The present disclosure also relates to a method 400 for regulating the dump rate of the truck 102. The system 108 may regulate the dump rate based on the level 'A' of the material 104 available in the container 106 and the draw down rate of the container 106. The system 108 may control the hydraulic system 122 of the truck 102 to vary the angular position of the payload carrier 120 for regulating the dump rate. The system 108 may also be configured to control the dump rate of the truck 102 from a central office located remotely from the worksite. In such a case, the controller 208 may be located in the central office. Thus, the system 108 provides flexibility in controlling the dump rate of the truck 102 from the truck 102, the central office or any other place in the worksite.

Figure 4:
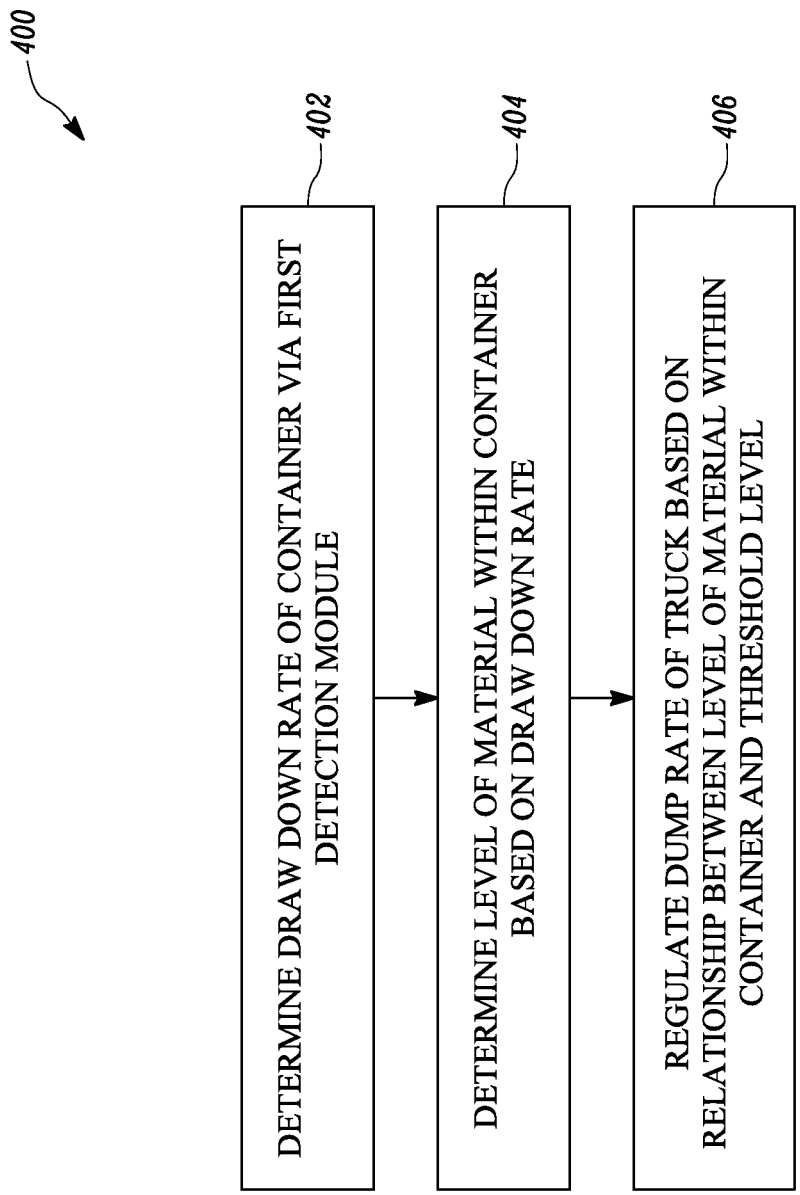
FIG. 4 is a flowchart of a method of regulating the dump rate of the truck, according to an embodiment of the present disclosure.

FIG. 4 illustrates a flowchart of the method 400 of regulating the dump rate of the truck 102, according to an embodiment of the present disclosure. At step 402, the draw down rate of the container 106 may be determined by the first detection module 202. For determining the draw down rate of the container 106, the input parameters detected by the scanning device 148 and the weighing unit 150 by the first detection module 202 may be used. At step 404, the level 'A' of the material 104 within the container 106 is determined based on the draw down rate.

At step 406, the dump rate of the truck 102 is regulated based on a relationship between the level 'A' of the material 104 within the container 106 and the threshold level B. The first warning may be generated when the level 'A' of the material 104 is below the predefined level C. Similarly, the second warning may be generated when the level 'A' of the material 104 is between the predefined level 'C' and the threshold level B. The payload carrier 120 of the truck 102 is moved about the pivotal axis XX to regulate the dump rate. The dump rate of the material 104 from the truck 102 can be controlled with the angular position of the payload carrier 120.

In another embodiment, an electric system may be used for moving the payload carrier 120 about the pivotal axis XX. In an example, the electric system may include an actuating member coupled between the payload carrier 120 and the chassis 110 of the truck 102. The electric system may further include an electric motor engaged with the actuating member. The actuating member may raise or lower the payload carrier 120 about the pivotal axis XX based on actuation of the electric motor to control the dump rate. In yet another embodiment, a pneumatic system may be used for moving the payload carrier 120 about the pivotal axis XX. In an example, the pneumatic system may include a compressor tank for storing a pressurized gas and a pneumatic actuator coupled between the payload carrier 120 and the chassis 110. The compressor tank may be controlled to supply the pressurized gas to the pneumatic actuator to raise or lower the payload carrier 120 about the pivotal axis XX to control the dump rate. It may also be contemplated that the dump rate of the truck 102 may be controlled based on gravity of the payload carrier 120.

With the present disclosure, the system 108 and the method 400 allow the operator to ensure that the container 106 is always appropriately loaded with the material 104. The dump rate of the truck 102 is regulated for ensuring an appropriate loading of the container 106. The present disclosure offers a technique that regulates the dump rate of a truck by considering the amount of material 104 that is being discharged from the container 106, thereby allowing an efficient filling of the hopper and optimized truck. As a result, the probability of overloading and under-loading of the container 106 is reduced, ensuring optimum utilization of the resources. Further, since the container 106 feeds the material 104 to another machine, appropriately loading the container 106 would ensure a smooth operation of the other machines as well. Therefore, the present disclosure offers the system 108 that is effective, easy to use, economical, and time-saving.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for regulating a dump rate of a truck, the truck configured to carry material and dump the material in a container, the system comprising:
 a first detection module configured to generate a signal indicative of a draw down rate of the container; and
 a controller in communication with the first detection module and the truck, the controller configured to:
  determine the draw down rate of the container based on the signal received from the first detection module;
  determine a level of the material within the container based on the draw down rate;
  determine the dump rate of the truck; and
  regulate the dump rate of the truck based on a relationship between the level of the material within the container and a threshold level.

2. The system of claim 1, wherein the controller is configured to:
 determine a rate of change of the level of the material within the container based on the signal received from the first detection module; and
 regulate the dump rate of the truck based on the rate of change of the level of the material.

3. The system of claim 1, wherein the controller is configured to generate a first warning when the level of the material within the container is below a predefined level, wherein the predefined level is below the threshold level.

4. The system of claim 3, wherein the controller is configured to generate a second warning when the level of the material within the container is between the predefined level and the threshold level.

5. The system of claim 1 comprising a regulating module disposed in the truck, the regulating module configured to move a payload carrier of the truck about a pivotal axis, wherein the payload carrier is configured to contain the material therein.

6. The system of claim 5, wherein the controller is configured to communicate with the regulating module to move the payload carrier about the pivotal axis based on the relationship between the level of the material within the container and the threshold level, and wherein dumping of the material is controlled based on an angular position of the payload carrier about the pivotal axis.

7. The system of claim 5, wherein the regulating module is configured to communicate with a hydraulic system of the truck, the hydraulic system configured to actuate the payload carrier about the pivotal axis.

8. The system of claim 1, wherein the first detection module comprises a weighing unit configured to detect an amount of the material discharged from the container.

9. The system of claim 1, wherein the first detection module comprises a scanning device configured to dynamically detect a volume of the material contained in the container.

10. The system of claim 1 comprising a sensing unit disposed on the truck, the sensing unit configured to communicate with the controller and generate a signal indicative of the dump rate of the truck.

11. A method of regulating a dump rate of a truck, the truck configured to carry a material and dump the material in a container, the method comprising:
 determining a draw down rate of the container via a first detection module;
 determining a level of the material within the container based on the draw down rate;
 communicating with the truck and determining a dump rate of the truck; and
 regulating the dump rate of the truck based on a relationship between the level of the material within the container and a threshold level.

12. The method of claim 11 further comprising:
 determining a rate of change of the level of the material within the container via the first detection module; and
 regulating the dump rate of the truck based on the rate of change of the level of the material.

13. The method of claim 11 further comprising, generating a first warning when the level of the material within the container is below a predefined level, wherein the predefined level is below the threshold level.

14. The method of claim 13 further comprising generating a second warning when the level of the material within the container is between the predefined level and the threshold level.

15. The method of claim 11 further comprising, moving a payload carrier of the truck about a pivotal axis based on the relationship between the level of the material within the container and the threshold level, wherein the dumping of the material is controlled based on an angular position of the payload carrier about the pivotal axis.

16. The method of claim 15 further comprising, generating a signal, via a sensing unit, indicative of the angular position of the payload carrier about the pivotal axis.

17. The method of claim 11, wherein the first detection module comprises a weighing unit configured to detect an amount of the material discharged from the container.

18. The method of claim 11, wherein the first detection module comprises a scanning device configured to dynamically detect a volume of the material contained in the container.

* * * * *